United States Patent
Ball et al.

(10) Patent No.: US 6,459,774 B1
(45) Date of Patent: *Oct. 1, 2002

(54) STRUCTURED VOICEMAIL MESSAGES

(75) Inventors: Thomas J. Ball, Naperville, IL (US); Michael Abraham Benedikt, Chicago, IL (US); Peter Andrew Mataga, Naperville, IL (US); Carlos Miguel Puchol, Naperville, IL (US); Kenneth G. Rehor, Berwyn, IL (US); Curtis Duane Tuckey, Chicago, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,441

(22) Filed: May 25, 1999

(51) Int. Cl.[7] .................................................. H04M 1/64

(52) U.S. Cl. ................ 379/67.1; 379/88.13; 379/88.17; 379/88.18; 379/88.22; 379/88.25; 379/908

(58) Field of Search ....................... 379/67.1, 68, 88.13, 379/88.17, 88.18, 93.01, 102.03, 900, 908, 88.22, 88.25, 88.27

(56) References Cited

U.S. PATENT DOCUMENTS

| | | | |
|---|---|---|---|
| 4,785,408 A | 11/1988 | Britton et al. | |
| 5,799,063 A | 8/1998 | Krane | .......................... 379/67 |

(List continued on next page.)

FOREIGN PATENT DOCUMENTS

| | | | |
|---|---|---|---|
| WO | WO 97/32427 | 9/1997 | ............ H04M/2/00 |
| WO | WO 97/40611 | 10/1997 | ........... H04L/29/06 |

OTHER PUBLICATIONS

D.L. Atkins, T. Ball, T. R. Baran, M.A. Benedikt, K.C. Cox, D. A. Ladd, P.A. Mataga, C. Puchol, J.C. Ramming, K.G. Rehor, and C. Tuckey, "Intetrated Web and Telephone Service Creation", *Bell Labs Technical Journal*, Winter, 1997, pp. 19–35.

(List continued on next page.)

*Primary Examiner*—Allan Hoosain
(74) *Attorney, Agent, or Firm*—Stephen M. Gurey

(57) ABSTRACT

A sender (101) creates a voicemail message that includes a plurality of messaging elements that include embedded instructions that define a structure of the message. Other messaging elements may include textual fragments, audio fragments that refer to audio data files that are associated with the message, and/or references to textual fragments and/or audio fragments that are stored at specified locations. The instructions may define a hierarchical menu structure which, when the message is presented to the recipient (106) by a messaging system (104), offers the recipient different navigational choices from which the recipient may select and thus effect the information content of what is presented. The structured message is sent by the sender to the recipient at an address on a messaging system that stores the message and is capable of interpreting and assembling the messaging elements in accordance with the embedded instruction and playing-out the message to the recipient when the recipient accesses the system and retrieves the message from storage. The structured message may also include links to a specific destination, to which the messaging system establishes a connection if the link is selected by the recipient during play-out of the message. Further, the messaging system can gather information from the recipient during play-out and forward that information to a specified destination, which may respond with another structured message. In the described embodiment, a phone markup language is used to define the structure and the inherent embedded instructions associated with the structure of the message.

38 Claims, 8 Drawing Sheets

U.S. PATENT DOCUMENTS

| | | | | | |
|---|---|---|---|---|---|
| 5,870,549 | A | * | 2/1999 | Bobo, II | 395/200.36 |
| 5,884,262 | A | * | 3/1999 | Wise et al. | 704/270 |
| 6,098,085 | A | * | 8/2000 | Blonder et al. | 707/531 |
| 6,112,049 | A | * | 8/2000 | Sonnenfeld | 434/350 |
| 6,134,235 | A | * | 10/2000 | Goldman et al. | 370/352 |
| 6,192,111 | B1 | * | 2/2001 | Wu | 379/88.13 |
| 6,233,318 | B1 | * | 5/2001 | Picard et al. | 379/88.17 |

OTHER PUBLICATIONS

J. C. Ramming, "PML: A Language Interface to Networked Response Units", Workshop on Internet Programming Languages, ICCL '98 Loyola University, Chicago, Illinois, May, 1998.

Q. Hardy, "AT&T, Motorola And Lucent in Pact On Internet Access", *The Wall Street Journal*, Tuesday, Mar. 2, 1999.

* cited by examiner

STRUCTURED VOICEMAIL MESSAGES

CROSS REFERENCE TO RELATED APPLICATIONS

This application describes and claims subject matter that is also described in co-pending United States patent applications filed simultaneously herewith and entitled: "METHOD AND APPARATUS FOR CREATING AND SENDING STRUCTURED VOICEMAIL MESSAGES", Ser. No. 09/318,140; and "METHOD AND APPARATUS FOR ASSEMBLING AND PRESENTING STRUCTURED VOICEMAIL MESSAGES", Ser. No. 09/318,450, now U.S. Pat. No. 6,240,391, issued on May 29, 2001.

TECHNICAL FIELD

This invention relates to voicemail messaging.

BACKGROUND OF THE INVENTION

Messaging systems allow a message recipient to listen to an audio message via his telephone or other audio terminal. In so-called voicemail systems, when the message is accessed from the voicemail system, the voicemail system typically presents header information, such as the time of receipt of the message and the identity of the sender, if known, and plays a recorded message, consisting of a segment of audio material, to the recipient. The recipient can navigate through the recorded message using his telephone keypad or voice input that can effect a skip, rewind, pause, or other similar operations. Recently, integrated messaging systems have been introduced that have voice interfaces that can handle conventional voicemail messages as well as messages of other media types, such as email. In the latter case, a textual email message is delivered to recipient's mailbox. When retrieved by the recipient through his audio terminal, the email header information is converted to audio and presented to the recipient together with the body of the message, which is played for the recipient using text-to-speech processing. Thus, in both the traditional voicemail systems and the integrated messaging systems, the body of the message is interpreted as a monolithic chunk of recorded audio or text, the latter being converted to audio, which audio in either case is played linearly to the recipient when he accesses his messaging system from his telephone or other audio terminal.

SUMMERY OF THE INVENTION

Voicemail and other messaging systems have revolutionized the way people communicate with each other in today's electronic age. Although the messaging systems available today are generally useful and have found widespread popularity, we have recognized that additional and highly advantageous functionality can be achieved in accordance with our invention.

The present invention is directed to a structured message that includes a plurality of messaging elements. The sending of such a message to a recipient's messaging system is the subject of co-pending patent application Ser. No. 09/318,140, filed on even date hereof. The assembly and presentation of the message, as described in further detail herein below, is the subject matter of patent application Ser. No. 09/318,450, also filed on even date hereof, and now U.S. Pat. No. 6,240,391, issued on May 29, 2001.

The structured message sent by a sender includes a plurality of messaging elements. These messaging elements may illustratively include textual fragments, speech fragments in attached audio files, references to audio or textual fragments stored at specified addresses, and explicit or implicit instructions that define the structure of the message. The message, including a plurality of such messaging elements is delivered to an address indicated in the message of the recipient's mailbox on a messaging system that has the capability of interpreting the instructions incorporated within the structured message. That messaging system, upon retrieval by the recipient, assembles, in accordance with the instructions that define the message structure, an audio message using the messaging elements associated with the message content, and presents that assembled message to the recipient in its intended format.

Advantageously, the delivery of the structured message may enable interactions between the recipient and the message content, and between the recipient and the outside world. In particular, the embedded instructions within the message may be such as to allow a dialog between the recipient and the messaging system. Indeed, that dialog can, in accordance with the embedded instructions, allow the recipient to navigate between messaging elements through voice and/or keypad inputs, as if the recipient was connected to an active interactive voice response (IVR) system. The recipient will thus hear those content-related messaging elements from within the structured message that are associated with and are responsive to his command inputs.

The structured message may also contain embedded addresses, or "links" as they are currently known in the Internet art, that specify a telephone address such as a telephone number, or an IP telephony address. If the recipient performs an action, such as making a keypad entry or supplying a voice input, during his interaction with a structured message, which action is interpreted by the messaging system to represent a selection by the recipient of a specific link, placement of a call to that telephone number or address associated with that link is effected by the messaging system. Alternatively, the structural message may contain embedded links that specify a destination for messaging rather than telephony connections. Examples of the latter include email addresses and Web services for HTTP upload.

The messaging system can gather information from the recipient during his interaction with the structured message, which information is then sent to a destination specified, for example, by the sender, such as a server or email address. Receipt of that gathered information may result in a response from the specified destination, which response is processed by the messaging system and forwarded to the recipient. This, in effect, initiates an interactive session between the recipient and a service that is active at the destination specified in the original structured message.

The various capabilities of the structured message can also be combined in several ways. As an example, a structured message may cause coordinated data and telephony actions. Thus, the messaging system can collect input data from the recipient, communicate that data to a specified destination system, such as a server, and place a telephone call to a phone number associated with that destination system. That destination system can then be provided with information over the telephone call that enables it to access the separately sent data. The destination system then may use that data to enhance the handling of the telephone call in various ways.

In a specific illustrative embodiment, the structured message is formulated by a sender using, for example, a phone markup language (PML) to define the structure and the inherent embedded instructions associated with the structure of the message. The message then consists of PML markup interleaved with other messaging elements such as textual fragments that will be converted to speech by the messaging system, and/or audio and textual fragments made part of the message as attached files or which are retrievable from a designated address. After formulating the message, the composite message is sent over a data network, as for example, an IP network such as the Internet, to the messaging system which stores the composite message for later retrieval by the intended recipient.

The messaging system includes those functionalities necessary to interpret the embedded instructions within the stored structured message and to audibly present it to the recipient, while also being able to receive and interpret a recipient's audio or touch-tone inputs for interaction with the message in accordance with the instructions. In the specific illustrative embodiment, the messaging system receives and stores the PML-formatted message sent by the sender over the data network. Upon being accessed by the recipient for retrieval of the message, the system accesses the message, and a processor interprets the PML markup within the message to effect playing of the textual and/or audio fragments of the message to the recipient in accordance with the embedded instructions associated with that markup. Thus, for example, for a structured PML-formatted message including fragments of text and attached audio files, the message is formulated by converting the text to speech using a text-to-speech processor, and inserting the appropriate audio file(s) during the play-out to the recipient in the proper sequence, as determined by the embedded instructions within the PML-formatted message. Further, the illustrative messaging system includes a detector for detecting the recipient's touch-tone keypad inputs and an automatic speech recognizer (ASR) processor for recognizing and interpreting the recipient's voice and touch-tone inputs to effect interaction and navigation within the structured message as allowed by the markup within the message, as well as the transfer to and interaction with other destinations as specified by the markup.

Advantageously, the structured message can be formulated by the sender through an editor with a graphical user interface running on a computer. Through the input of textual files, previously recorded audio fragments, as well as contemporaneously recorded fragments, the sender is able to formulate the structured message. Alternatively, the structured message could be created "by hand" with a text editor and an audio file recording utility.

Advantageously, if the structured message is sent to a plurality of recipients, the invention allows information to be gathered from each, without requiring real-time telephonic communications with each individual recipient to collect that information.

Although noted above as being associated with audio messaging, it should be understood that the present invention could equally be applied to multi-media type of messaging in which the messaging elements of the structured message may include video fragments that are assembled by the messaging system in accordance with the instruction embedded within the structured message.

DETAILED DESCRIPTION

Figure 1:
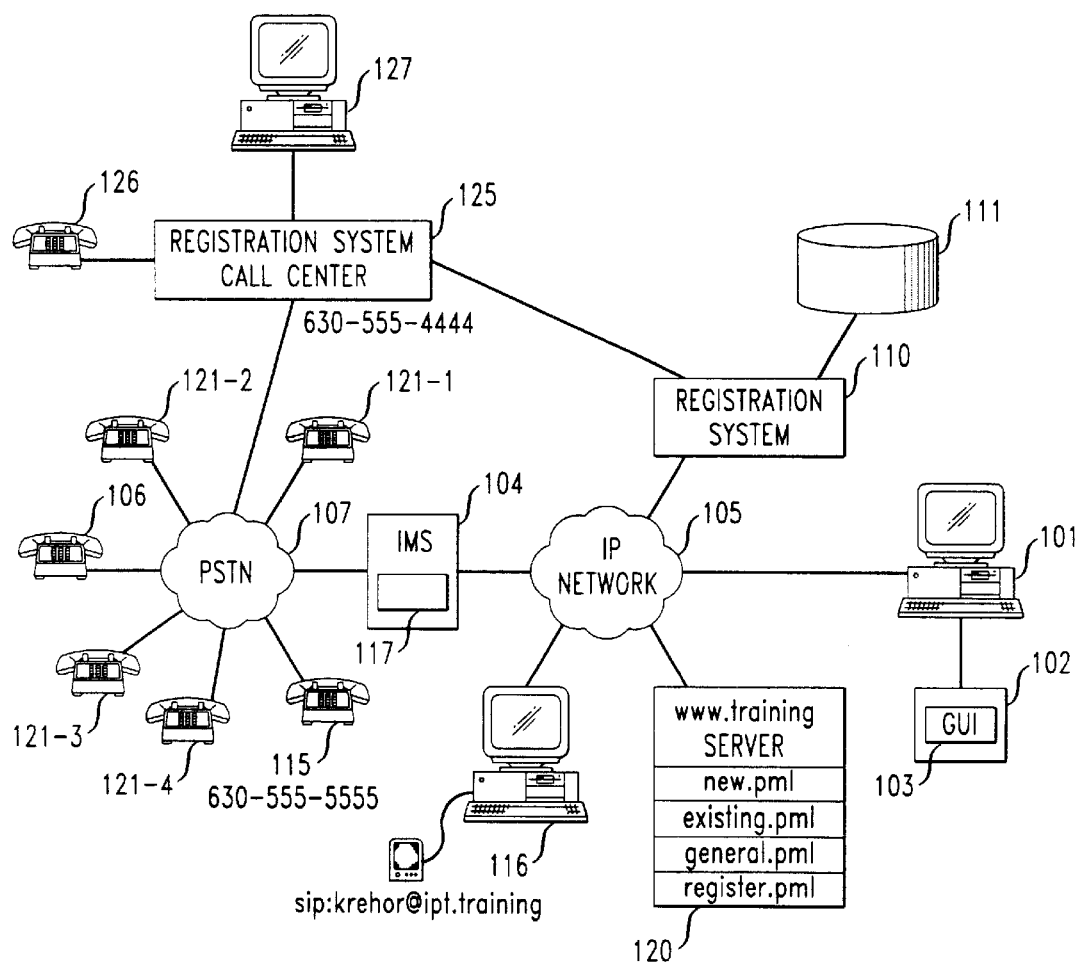
FIG. 1 is a block diagram of a system incorporating a messaging system that is capable of receiving, storing, and presenting to a recipient a structured message.

With reference to FIG. 1, a system incorporating and using a structured message is shown. A sender at a client terminal 101 running an editor 102 with graphical user interface (GUI) 103 prepares the structured voicemail message, which is transmitted to an integrated messaging system 104 over a wide or local area data network, such as an IP network 105 like the Internet or an Intranet. Integrating messaging system 104 is a messaging system that is capable of receiving conventional voicemail messages, email messages, and structured messages of the type described herein. With respect to the structured messages, messaging system 104 is capable of receiving, storing, interpreting, and delivering such structured messages to the intended recipient when he accesses his mailbox through an audio terminal, such as a telephone set 106 connected to the PSTN 107. The messaging system 104, as will be described, is also capable of accepting and processing touch-tone keypad or voice inputs from the recipient received during the recipient's interaction with the structured message. Although the recipient is shown in FIG. 1 connected by his telephone 106 to messaging system 104 via PSTN 107, it is recognized that the recipient could also be connected via his telephone set to the messaging system over an IP-telephony connection, or over any other type of analog or data network.

The structured message includes a plurality of messaging elements. These messaging elements illustratively include large or small textual fragments that, when formulated for presentation to the recipient, are converted by the messaging system to speech; large or small audio or textual fragments contained in files that are attached as separate files to the structured message; large or small textual or audio fragments that are located and retrievable from a specified address on the network on which the messaging system 104 is located; and implicit or explicit embedded instructions that define the structure of the message. The latter includes not only the order in which the fragments are to be audibly presented to the recipient when the message is retrieved by the recipient from the messaging system 104 via telephone 106, but also define, illustratively, the inputs that may need to be collected from the recipient through his keypad or voice input over telephone 106 during the dialog of the message. Further, the instructions define the messaging elements to be audibly presented to the recipient in response to such recipient inputs. Even further, these embedded instructions may also define the actions messaging system 104 is to take in response to a recipient's inputs, which actions are separate from navigating within the message, such as establishing a connection to another location. The message further includes the recipient's address on a messaging system that is capable of interpreting the instructions embedded within the message.

As will be later described, the structured message is prepared by the sender from the graphical user interface 103 on editor 102 from a collection of pre-recorded audio files containing either small or large voice fragments, through the real-time input of audio fragments, through the input, from a keyboard, of large and/or small textual message fragments, and/or through reference to other textual or audio files. For the specific embodiment disclosed herein, editor 102 formulates the structural message using a phone markup language (PML) to define the textual and audio elements of the message and the embedded instructions within that message. As will be apparent from the specific examples later described in detail, the resultant message is a "page" containing PML markup that is similar in visual appearance to an HTML "page" created by an HTML editor used for creating conventional Web pages delivered for visual display on a video terminal such as a television or a computer monitor. The PML "page" created by editor 102 that represents the message thus contains PML markup and textual components that will be converted into audio by the messaging system 104. Further, the resultant structured message may also includes attachments that may be actual audio or textual files that are attached to the message, or addresses on the IP network 105, such as URLs, from which audio or textual files can be accessed and downloaded to the messaging system.

A phone markup language is a language that has been implemented to allow users at audio terminals, such as telephones, to interface with Web-based voice response units to access interactive voice response (IVR) services and to access other Internet-connected Web servers. (See, e.g., "PML: A Language Interface to Networked Voice Response Units", by J. C. Ramming, Workshop on Internet Programming Languages, ICCL '98, Loyola University, Chicago, Ill., May, 1988, which is incorporated by reference herein). Recently, AT&T, Motorola, IBM and Lucent Technologies announced. a joint cooperation activity for implementing a voice extensible markup language that will allows end users at voice terminals to access the Internet by voice (See, e.g., *Wall Street Journal*, Mar. 2, 1999). That language is expected to become a standard for defining voice commands to the Internet and is likely to incorporate many aspects of the PML described in the above-cited paper by J. C. Ramming. Such Web-based interactive voice services are provided to telephone users through what shall hereinafter be called a telephone/IP server. Such a telephone/IP server terminates a telephone call on one side, and is connected to the IP network on the other. The ability for an end user at an audio terminal, such as a telephone, to access the Internet is described in, for example, International Application Published Under the Patent Cooperation Treaty (PCT), Publication Number WO 97/40611 entitled "Method and Apparatus For Information Retrieval Using Audio Interface", published Oct. 20, 1997 and claiming a priority date of Apr. 22, 1996 based on a co-pending U.S. patent application Ser. No. 08/635,801 to M. A. Benedikt, D. A. Ladd, J. C. Ramming, K. G. Rehor and C. D. Tuckey; D. L. Atkins, T. Ball, T. R. Baran, M. A. Benedikt, K. C. Cox, D. A. Ladd, P. A. Mataga, C. Puchol, J. C. Ramming, K. G. Rehor, and C. D. Tuckey, "Integrated Web and Telephone Service Creation", Bell Labs Technical Journal, pp. 19035, Winter 1997; and U.S. patent application Ser. No. 09/168,405, filed Oct. 6, 1998 to M. K. Brown, K. G. Rehor, B. C. Schmult and C. D. Tuckey entitled "Web-Based Platform for Interactive Voice Response (IVR)", all of which are incorporated by reference herein.

As described in these aforenoted references, an end user at an audio terminal, such as a telephone, can access IVR services on an IP network through the telephone/IP server that interfaces the PSTN voice network and the IP network, such as the Internet or other wide area or local area computer. network. The telephone/IP server functions to enable end users to engage in interactive services via their telephone set with Web servers connected on such a wide area or local area network. The telephone/IP server, as described in the references, is embodied as hardware and software on a general purpose computer that together perform the functions of audio play and record, text-to-speech synthesis, dual-tone multi-frequency (DTMF) (touch-tone) recognition, automatic speech recognition (ASR) processing, and other call control functions necessary for interactive audio services. Such a telephone/IP server functions to accept inputs from the telephone end user as speech or DTMF signals, and act as a proxy browser for that end user in making requests over the Internet to those Web servers that provide the IVR services with which the end user wishes to interact. The telephone/IP server and the Web servers providing the IVR services communicate using a PML. As noted, PML will be supplanted in the future with the expected-to-be standardized voice extensible markup language.

We have recognized that advantageous results can be achieved by incorporating the functionalities of the telephone/IP server into an integrated messaging system 104. A structured message prepared by the sender from, as an example, client terminal 101, and which includes a plurality of messaging elements that are formatted with PML markup, or the like, is sent to such an integrated messaging system 104 having these functionalities and then stored. When the recipient accesses messaging system 104, the message is retrieved from storage and processed in accordance with the embedded instructions with the PML marked-up stored message. The messaging system 104, thus includes an interpreter that is able to interpret the embedded instructions and audibly present the message to the recipient in the manner intended by sender. Thus, the various messaging elements may include a combination of textual fragments within the body of the message, audio and/or textual fragments in data files attached to and stored with the message, and textual and/or audio fragments stored at specified URLs on IP network 105. For play-out, the textual messaging elements are converted to speech by a text-to-speech processor, and combined with each other and audio fragments, converted from their data files, so as to present an audio message to the recipient that, to the recipient's ears, has the aural appearance of a unified message.

Advantageously, the structured message sent by the sender to the recipient's integrated messaging system 104, may be structured with the PML markup to enable interactions between the recipient and the message content, and between the recipient and the outside world, when the recipient retrieves the message. The PML-formatted and stored message may thus include markup that is interpreted by the interpreter to present, for example, a selection choice to the recipient. The interpreter, in presenting the message to the recipient, would then expect to receive an input from the recipient in response to the selection choice. The recipient's particular input, inputted via the touch-tone keypad on telephone set 106, or by voice, which an automatic speech recognition (ASR) processor recognizes, determines how and what is to be presented to the recipient within the message.

The details of the messaging system as it receives and stores a structured message, and then processes that message when later retrieved by the recipient will be discussed hereinafter, as will the details associated with preparing the structured message from the sender's end. A better understanding of the invention can be achieved by first examining several specific examples of structured messages below. In the examples described below, it is assumed that the integrated messaging system to which structured messages are sent and from which messages are retrieved is located on a corporate intranet so that the PML used to format the messages can be standardized between all message senders and the messaging system can easily be arranged. A messaging system that is available to receive structured messages from any recipient would require a larger scale standardization of the phone markup language, which as previously noted is the intent of the announced joint project between AT&T, Motorola and Lucent Technologies. The IP network 105, in the examples that follow, is thus assumed to be a corporate Intranet to which the sender at client terminal 101 is also connected.

For ease of understanding the examples that follow, a common scenario is postulated. Specifically, in these examples, the postulated scenario is that the sender of the structured messages is an internal corporate training organization that wants to inform employees of course availability, and that such employees be able to access information and to register for such courses through their telephones. Rather than dedicate a voice response system and to support the telecommunications infrastructure (e.g., many incoming lines) needed for such purposes, structured messages are sent to the mailboxes of employees on an integrated messaging system 104, which is capable of understanding and interpreting such structured messages. A particular PML is assumed herein as the structuring mechanism in the examples that follow, with the interpretation of the markup described.

The general structured message of the present invention mixes a plurality of textual fragments and audio fragments at a fine granularity. This capability is likely to be most useful for automatically generated messages with fixed recorded audio, and generated text content. The mechanism for fragment assembly is through the use of embedded markers that indicate when an audio file and when text-to-speech processing needs to be performed on a textual fragment. The audio file, or a textual file, may be part of the message itself (e.g., an email attachment, or multipart MIME message), or can be retrievable from elsewhere in the network 105 to which the messaging system is connected via a URL. Audio content may be sequential with other content in the structured message, or played in the background.

As a first example of the structured message, it is postulated that the training organization wants to send a confirming message to everyone who signs up for a course. The message is an email automatically generated by the registration system 110 and sent to the registrant's mailbox on the integrated messaging system 104. The generated message sent may appear as shown in Table 1.

TABLE 1

<PML>
   <AUDIO SRC="inspirational.au" BACKGROUND/>
   <AUDIO SRC="for.au"/>
   Peter Mataga
   <AUDIO SRC="from.au"/>.
   <AUDIO SRC="thanks.au"/><AUDIO SRC="course.au"/>
   UM301: Advanced Unified Messaging.
   <AUDIO SRC="course.au"/><AUDIO SRC="when.au"/>
   January 26, 1999 from 3:00pm to 5:00pm.
</PML>

The message also includes six MIME attachments, audio files: "inspirational.au", "for.au", "from.au", "thanks.au", "course.au" and "when.au", which are retrieved from within the PML-formatted message. To play the message to the recipient when he retrieves it by accessing his mailbox on messaging system 104, messaging system 104 assembles information from the message, using the textual part of the message in two ways. First, the markup elements, delimited by angle brackets in the example markup used in Table 1, are used to determine the message structure. Second, textual content occurring within or between the markup elements are synthesized to speech at an appropriate point in the play-out of the message to the recipient. In this example, the message structure is simple, requiring playing of audio files and performing text-to-speech (TTS) processing in an interleaved (and possibly parallel) fashion.

The recipient at telephone set 106 hears the following when this structured message is outputted by messaging system 104. To aid in understanding the functions of the messaging system, the audio-file generated fragments are underlined below, while the TTS fragments are shown in plain text:

(inspirational music plays in background . . . )
"This is a message for Peter Mataga from the training organization. Thank you for registering for the course 'UM301:Advanced Unified Messaging'. The course will take place Jan. 26, 199 from 3:00 pm to 5:00 pm."

The text fragments "Peter Mataga", "UM301: Advanced Unified Messaging", and "Jan. 26, 1999 from 3:00 Pm to 5:00 pm" are converted to speech. The background music and the audio fragments "This is a message for", "from the training organization", "Thank you for registering for", "the course", and "will take place" are generated by playing the audio files of appropriate names (identified in the markup), after detaching them from the structured message.

Figure 2:
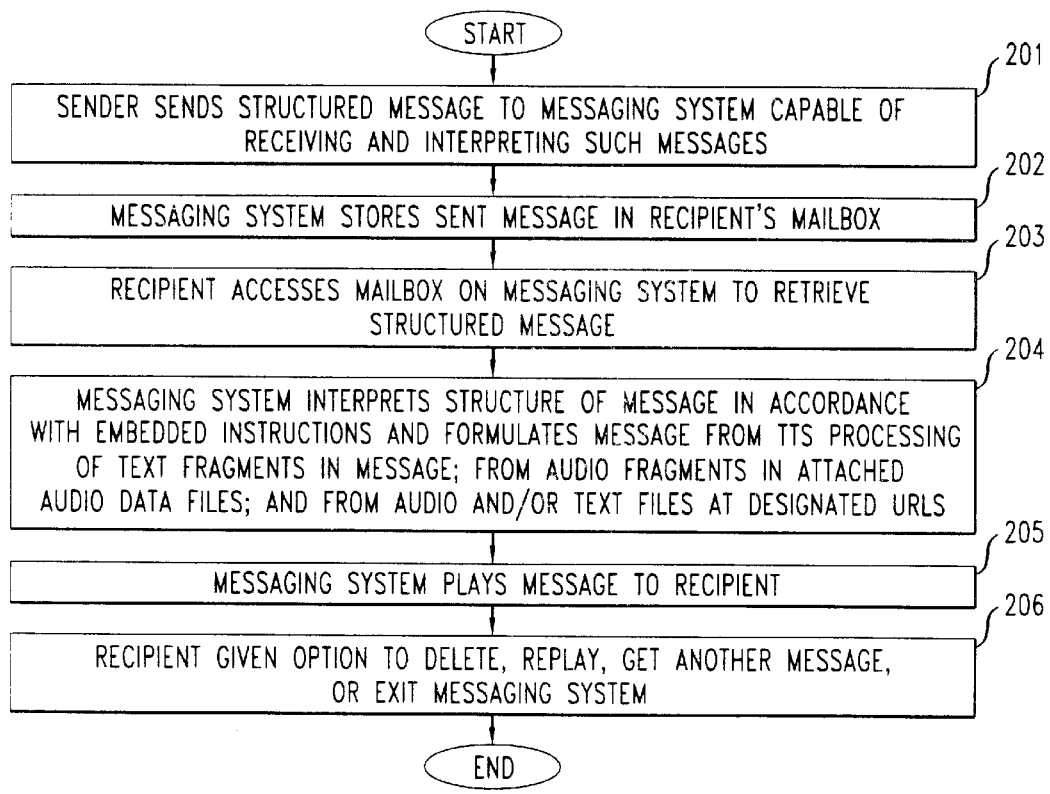
FIG. 2 is flowchart showing the steps associated with sending and delivering a structured message to a recipient.

The flowchart in FIG. 2 illustrates the steps of the method of sending and receiving a basic structured message of the type just described. At step 201, the sender sends the structured message to an integrated messaging system capable of receiving and interpreting the embedded instructions within the message and presenting the message to the recipient in accordance with those instructions when the recipient accesses the mailbox. At step 202, the messaging system stores the message sent by the sender. At some later time, at step 203, the recipient accesses the messaging system and retrieves the stored structured message. At step 205, the messaging system interprets the structure of the retrieved message from the embedded instructions and formulates the message from a combination of: TTS processing of text fragments in the message body, text fragments in files attached to the message, and/or text fragments at designated URLs; and/or playing audio fragments in attached data files or from addresses at designated URLs. At step 206, the messaging system audibly presents the formulated structured message to the recipient. After listening to the message, at step 205, the recipient may delete, or replay the message, retrieve another message, structured or not, from the messaging system, or exit the messaging system.

Whereas a message sender can individually specify a structured message of this type, such a message can also be automatically generated. The ability to automatically generate a structured message is of particular use when a sender, such as the training organization in this example, must send out many such messages to each of the individuals who have registered for a course. Thus, for this case of automatic message generation, the audio files would most likely represent information that is the same for all the messages of this type, while the embedded text would be dynamic information that changes from individual message to individual message, which information can be retrieved, for example, from a database 111 or a transaction system.

Figure 3:
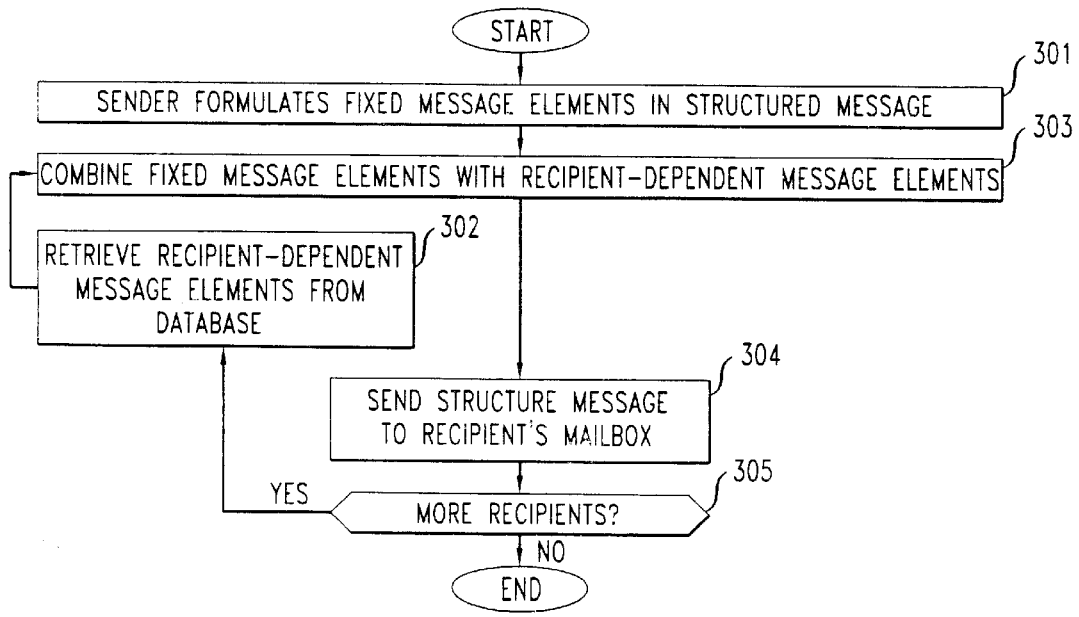
FIG. 3 is a flowchart showing the steps associated with sending a customized structured message to a plurality of recipients.

FIG. 3 is a flowchart showing the steps associated with formulating and sending a customized structured message to a plurality of recipients. At step 301 the sender formulates a structured message that includes as content-related messaging elements only those messaging elements that are common to the message sent to each recipient's mailbox. At step 302, one or more content-related messaging elements that are associated with a particular recipient are accessed from another source, such as a database or a transaction system. These one or more messaging elements can be textual or audio in nature. At step 303, the recipient-specific messaging elements and the non-recipient-specific messaging elements are combined to formulate the message to be sent to the particular recipient's mailbox. The recipient-specific messaging element can be incorporated as text within the structured message, or can affixed to the message as an attached textual or audio data file. At step 304, the combined structural message is sent to the intended recipient's mailbox. At step 305, a determination is made whether any other recipients are to receive the structured message. If yes, the flow returns to step 302 to access one or more content-related messaging elements that are associated with another such recipient, which is then combined with the non-recipient specific messaging elements to formulate a message that is sent to this next recipient's mailbox.

The structured message may contain a substructure that allows the recipient to navigate through the message without linearly listening to all of the message content that was sent by the sender and resides in the recipient's mailbox. An example is that of a message divided into sections with headings for which the messaging system might read all the headings and then allow the recipient to choose one or more sections to listen to. Sections might also have subsections, and so forth. As an example, the training organization sends out a weekly informational email describing the current course offerings to its employees' mailboxes. A recipient is not likely to want to listen to all of the information in the message, but only to those parts that are of particular interest to him. Table 2 is an example of such a message. It should be noted that in this example, and the examples that follow, for readability purposes, textual content rather than audio files are generally used. However, embedded audio content, as was used in the example in Table 1, could be substituted anywhere TTS processing is employed.

TABLE 2

```
<PML>
    This is your monthiy training course update.
    New courses in the unified messaging area are availabie this week,
            as well as our existing course offerings.
    <MENU>
        <PROMPT></ PROMPT>
        <ITEM><TITLE>New Courses<TITLE>
            There are several new courses available this week.
            <MENU>
                <PROMPT>  Please select a course to hear a brief
                            description: </PROMPT>
                <ITEM><TITLE>Introductory Unified Messaging</TITLE>
                    This course covers ...
                </ITEM>
                <ITEM><TITLE>Advanced Unified Messaging</TITLE>
                    This course covers ...
                </ITEM>
            </MENU>
        </ITEM>
        <ITEM><TITLE>Existing Courses</TITLE>
            We provide courses in a variety of categories.
            <MENU>
                <PROMPT>Please select a course category:</PROMPT>
                <ITEM><TITLE>Widget Courses</TITLE>
                    <MENU>
                        <PROMPT>  Select a course to hear a brief
                                    description: </PROMPT>
                        <ITEM><TITLE>Introductory Widgets</TITLE>
                            This course covers ...
                        </ITEM>
                        <ITEM><TITLE>Intermediate Widgets</TITLE>
                            This course covers ...
                        </ITEM>
                        <ITEM><TITLE>Advanced Widgets</TITLE>
                            This course covers ...
                        </ITEM>
                    </MENU>
```

TABLE 2-continued

```
    <ITEM><TITLE>Gadget Courses</TITLE>
        <MENU>
            <PROMPT>  Select a course to hear a brief
                     description:</PROMPT>
            <ITEM><TITLE>Introductory Gadgets</TITLE>
                This course covers ...
            </ITEM>
            <ITEM><TITLE>Intermediate Gadgets</TITLE>
                This course covers ...
            </ITEM>
            <ITEM><TITLE>Advanced Gadgets</TITLE>
                This course covers ...
            </ITEM>
        </MENU>
    </ITEM>
  </MENU>
  </ITEM>
  <ITEM><TITLE>General Information</TITLE>
      General inquiries about training should be directed to
      our main office at area code 630, 979-1960.
  </ITEM>
</MENU>
Goodbye. We hope to see you in one of our courses soon!
</PML>
```

When the message in Table 2 is received by the messaging system 104, stored, and later retrieved by the recipient, the interpreter recognizes the markup within the message and from that the structure of the message, thereby enabling it to interpret that structure for presentation to the recipient, where that structure in this example defines a set of hierarchical menus. In the example in Table 2, unlike the example in Table 1, the markup elements have content, which may also be structured. For example, a MENU element begins with the markup <MENU> and ends with the markup </MENU>. In between may occur a PROMPT element (possibly with no content) and one or more ITEM elements, each of which must enclose a TITLE element followed by any kind of content, including another MENU.

The MENU element represents an opportunity for the recipient while listening to the message to make a navigational choice. The integrated messaging system processes a MENU element, when encountered during processing and play-out, by playing to the recipient the content of the PROMPT, which can be any combination of audio files and TTS information, and offering the TITLES of the ITEMS as choices. It should be noted that only ITEMS that occur immediately as content of the MENU element are treated in this manner—ITEMS that occur deeper in the hierarchy, as content of enclosed MENU elements, are not used until the MENU in which they occur is processed. The recipient makes a choice, by keypad entry, speech, or other signaling method, and the content of the ITEM is read to the recipient, possibly involving other complex processing. The default behavior assumed herein for menus in this example is that the item is processed, then the menu is presented again. The recipient may choose to quit from a menu, in which case processing of the message continues after the menu. If a menu is part of an item in a parent menu, reprompting for the parent menu will result. The quit choice presented to the recipient might also be sensitive to whether the menu is a top-level menu or not. It should be noted, there are many other possible behavior customizations for menus; the markup could include instructions to the messaging system that control such behavior. The example presented in Table 2 is thus only one example of a possible menu customization.

The effect of the interpretation of the message structure by the messaging system is that the recipient can navigate through the information in the message, listening (possibly more than once) only to the parts in which he is interested. A possible recipient interaction scenario for the received message in Table 2 is presented below. In the scenario below, italicized phrases indicate audio boilerplate that is generated by the interpreter 117 in the messaging system 104 to present menus and other standard interactions, while plain text is TTS translations of fragments from the message, such as the item titles;

parenthetical items denote the actions taken by the recipient:

"This is your monthly training course update.

New courses in the unified messaging area are available this week, as well as our existing course offerings.

For New Courses, press 1;

For Existing Courses, press 2;

For General Information, press 3;

To exit this menu, press pound sign."

(Recipient presses 2)

"We provide courses in a variety of categories.

Please select a course category:

For Widget Courses, press 1;

For Gadget Courses, press 2;

To return to the previous menu, press pound sign."

(Recipient presses 1)

"Please select a course to hear a brief description:

For Introductory Widgets, press 1;

For Intermediate Widgets, press 2;

For Advanced Widgets, press 3;

To return to the previous menu, press pound sign."

(Recipient presses 3)

"This course covers . . .

For Introductory Widgets, press 1;

For Intermediate Widgets, press 2;

For Advanced Widgets, press 3;

To return to the previous menu, press pound sign."

(Recipient presses #)

"Please select a course category:

For Widget Courses, press 1;

For Gadget Courses, press 2;
To return to the previous menu, press pound sign."
(Recipient presses #)
"For New Courses, press 1;
For Existing Courses, press 2;
For General Information, press 3;
To exit this menu, press pound sign."
(Recipient presses #)
"Goodbye. We hope to see you in one of our courses soon!"
(At this point the recipient receives the usual messaging system options to delete the message, listen to the message again, etc.)

Processing of this kind of structure still involves extraction of fragments from the message in Table 2 to present to the recipient, as in the message in the example of Table 1. However, the extraction process is more complex, requiring finding all item titles for a menu, constructing audio boilerplate to indicate the choices, and significantly, depends dynamically on interactions with the recipient, which determine specifically those portions of the structured message that are actually audibly presented to the recipient.

Figure 4:
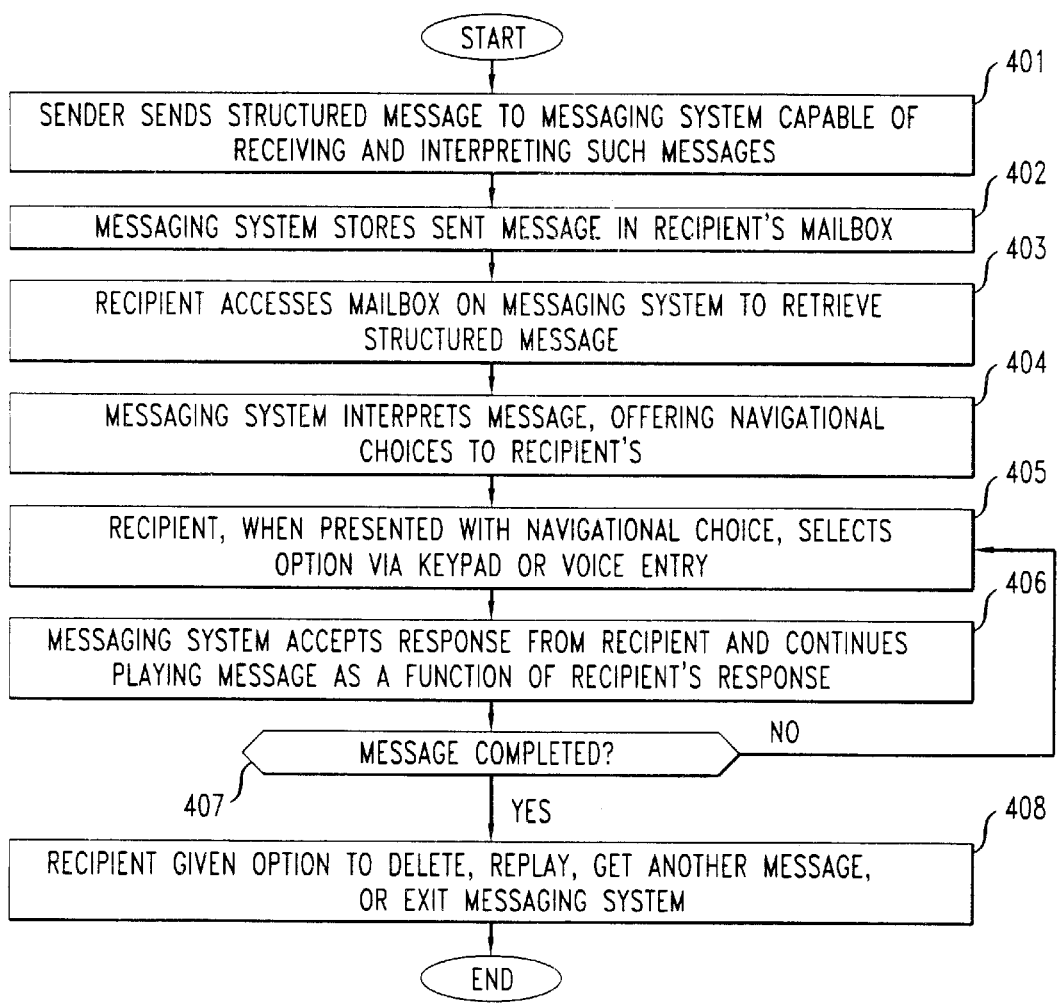
FIG. 4 is a flowchart associated with the steps of sending a structured message to a recipient which allows interaction between the recipient and the message.

The flowchart in FIG. 4 illustrates the steps associated with sending to a recipient a structured message which allows interaction between the recipient and the message, as described above. Steps 401, 402 and 403 are the same as steps 201, 202 and 203 in the flowchart in FIG. 2, described above, and for brevity, are not repeated herein. At step 404, the messaging system interprets the structured message, audibly offering navigational choices to the recipient, ,the navigational choices and the presentation of such choices being determined in accordance with the embedded instructions within the message. At step 405, the recipient, when presented with a navigational choice, selects an option, as an example, via keypad or voice input through his telephone set. At step 406, the messaging system, in response to and as a function of the recipient's input, continues to deliver audio content to the recipient from within the structured message. At step 407, a determination is made whether the message is completed. If yes, at step 408, the recipient can delete or replay the message, retrieve another message, or end his interaction with the messaging system. If, at step 407, the message is not complete, the presentation of the structured message to the recipient continues at an entry point following the previous navigational choice, further navigational choices being offered to the recipient if the structured message is so formatted.

The structured message may also contain embedded addresses, or "links" as they are currently known in the Internet art, that specify a telephone address such as a telephone number (e.g., 630-555-5555 of a telephone set 115 on PSTN 107), or an IP telephony address (e.g. sip:krehor@ipt.training at client terminal 116). The link may optionally also contain additional information, such as DTMF information, which can typically represent an "extension" specified as a string of keypad numbers, symbol and/or letters. In the packet telephony case, the link may specify other kinds of additional information, to be passed along with the call setup message. For example, a SIP INVITE could include additional header information as specified in appropriate link attributes.

To process such a link the messaging system 104 offers the recipient, for example, an opportunity to make an outgoing call to that linked address. If the recipient performs a responsive action to that offer, such as making a keypad entry or supplying a voice input, which command is interpreted by the messaging system to represent an affirmative election by the recipient to select that link, the messaging system 104 dials out to that telephone number over PSTN 107 (or the equivalent for non-PSTN destinations) and, on answer, plays the sequence of DTMF tones corresponding to the "extension", and then allows the recipient to continue on telephone set 106 with the just established call to the answering party at telephone set 115. It should be noted that the dialed tones could alternatively be used for some other general call handling purpose rather than being interpreted as an extension. After the recipient terminates his conversation over the outcall placed by the messaging system 104 to telephone set 115, the messaging system may resume control for continued interaction with the recipient, thereby allowing the recipient to continue accessing a next message from his mailbox. Alternatively, the messaging may relinquish control of the call at the time of the outcall, thereby effectively transferring the recipient to that call to telephone set 115, and exiting the session with the messaging system 104.

In addition to links to telephone numbers or IP telephony addresses, the message may contain embedded links that specify destinations for messaging rather than telephony connections. Examples of the these include email addresses and Web services for HTTP upload. If the recipient chooses to act on one of these links, a voice message may be recorded and sent to the specified link address as, for example, an email attachment.

An example of a structured message with several types of embedded links is shown below in Table 3. For this example, it is assumed that the training organization sends this email to each employee's integrated mailbox.

TABLE 3

<PML>
    This is your monthly training course update.
    New courses in the unified messaging area are available this week.
    For information, call
    <LINK TYPE=CALL DEST="sip:krehor@ipt.training">
      Ken Pehor
    </LINK>.
    For information on existing courses, call
    <LINK TYPECALL DEST="pstn:630-555-5555" DTMF="3,2">
      the automated course information system
    </LINK>.
    As usual, general inquiries about training can be directed to

TABLE 3-continued

```
<LINK TYPE=MESSAGE DEST="mailto:sgurey@mailserv.training">
    Steve Gurey
    </LINK>.
</PML>
```

This message is presented to the recipient in the usual sequential manner, except that embedded links are treated specially. Specifically, the content of the LINK element (extracted from between the <LINK> and <\LINK>markup) is presented to the recipient, together with additional information about the potential outcall. The recipient may then choose to have the messaging system place the call or send a message to the specified destination.

For this example, the interaction between the recipient and the messaging system may be as follows. Again, boilerplate audio generated by the messaging system is italicized. It can be noted that this boilerplate usually surrounds TTS fragments taken from the content and attributes of the markup elements, such as the description and the phone number of the destination. Moreover, the attributes of the markup elements influence the recipient's interaction. Thus, a LINK type of CALL is presented differently, and leads to different actions by the messaging system, from a LINK type of MESSAGE. It is assumed in the following example that the integrated messaging system 104 has automatic speech recognition capabilities.

"*This message contains active links. Say 'call' or 'send' to follow a link.*"

"This is your monthly training course update.

New courses in the unified messaging area are available this week.

For information, call Ken Rehor at SIP address krehor at ipt dot training."

(Note that the UTS text "Ken Rehor" comes from the content of the LINK element, while the SIP IP telephony address "krehor@ipt.training" comes from the DEST attribute of the element, which is recognized as a SIP URL.)

(The messaging system pauses briefly to allow the recipient to follow the link [i.e., make an IP telephony call through the network 105 to the address indicated]. If no action is taken, the messaging system continues.)

"For information on existing courses, call the automated course information system at phone 630-555-5555, extension 3,2."

(Messaging system pauses, recipient says 'call') "*Placing call . . . press pound sign to terminate the call.*"

(Messaging system 104 dials telephone set 115 at 630-555-5555, waits for answer, sends DTMF tone 3, pauses, then sends tone 2, conferences in recipient, then waits for call termination)

(Recipient has conversation with called party, presses # to terminate outcall.)

(Messaging system 104 disconnects outcall connection, resumes message session)

(Recipient chooses to hear message again; this time does not follow either phone link)

". . .

As usual, general inquiries about training can be directed to Steve Gurey at email sgurey at mailserv dot training."

(Messaging system pauses, recipient says 'send')

"*Record an audio message at the tone.*"

(Recipient records an audio message)

"*Sending message.*"

(Messaging system sends the message as a MIME attachment to an email message to sgurey@mailserv.training on IMS 104)

(Messaging system resumes email session)

(Recipient chooses to hear message again; this time does not follow any link. After the message has been presented, the messaging system offers the recipient the opportunity to review the links in the message, presenting the content of each LINK element encountered within the message)

"*To list all the links in this messages, say 'links'.*"

(Recipient says 'links')

"Call Ken Rehor;"

(pause)

"Call the automated - - - "

(Recipient barges in to say 'Rehor')

(Messaging system places call to SIP address krehoraipt@training)

A common use for the above-described facility would be in combination with the navigational facility of the example associated with Table 2, to provide a small directory service contained in a message.

Figure 5:
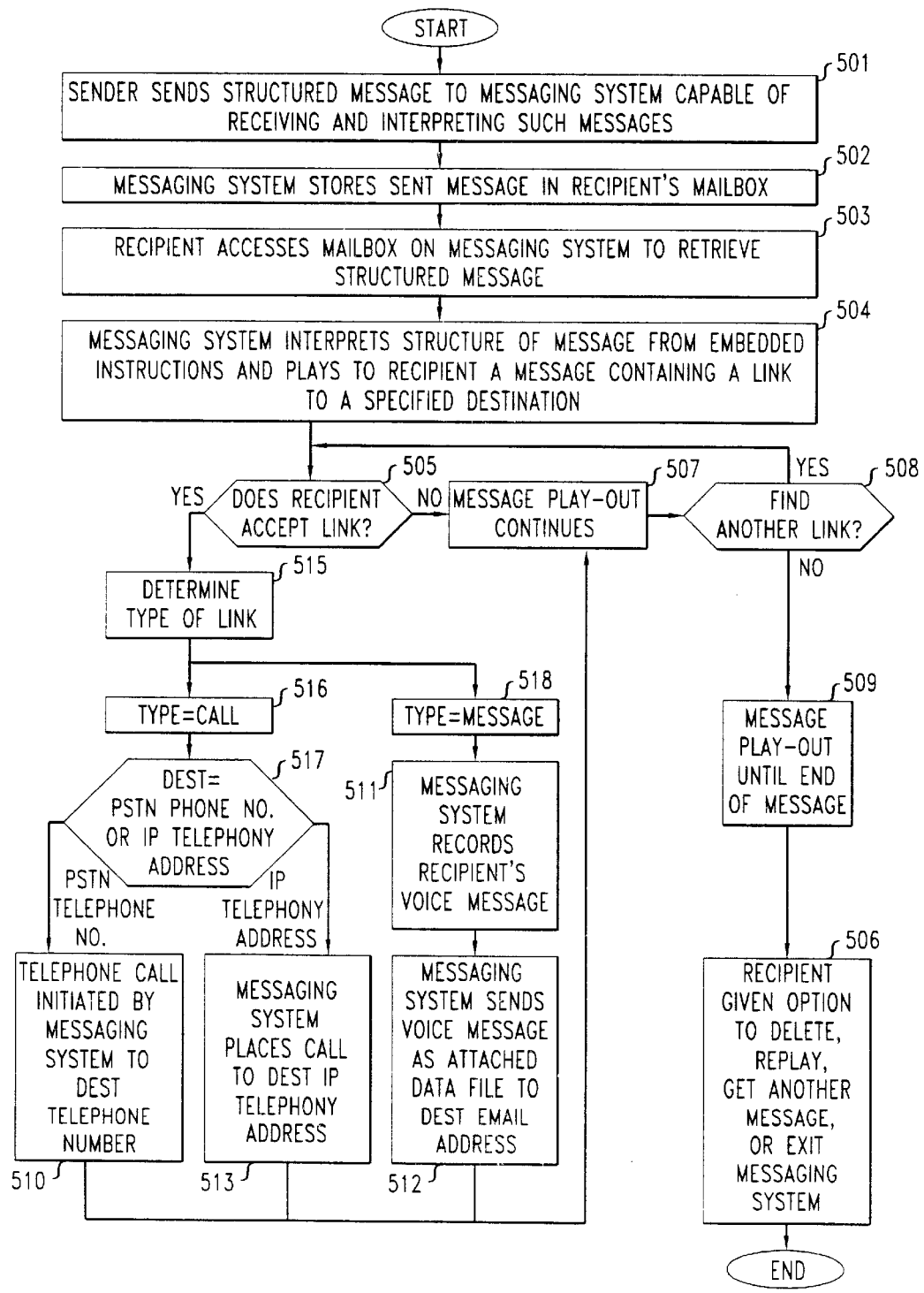
FIG. 5 is a flowchart associated with the steps of sending to a recipient a structured message which has embedded links.

The flowchart in FIG. 5 illustrates the steps associated with sending to a recipient a structured message, which has embedded links as described above. Steps 501, 502 and 503 are the same as steps 201, 202 and 203 in the flowchart in FIG. 2, described above, and for brevity, are not repeated herein. At step 504, the messaging system interprets the structure of the message from its embedded instructions and plays a message to the recipient that contains a link to a specified destination. At step 505, in response to presenting to recipient, during message play-out, a messaging element having an associated link, the messaging system determines whether the recipient responds affirmatively to accept a transfer to that linked destination. If, at step 505, the link transfer is not accepted by the recipient, at step 507, message play-out continues. If during the continued play-out of the message another link is encountered and presented at step 508, the flow then returns to step 505 to determine whether the recipient accepts that link. If, during the continued play-out of the message, another link is not encountered at step 508, message play-out continues until the end of the message at step 509. Following the end of the message, at step 506, the recipient is given the option to delete, replay, maintain the message in storage, or exit the messaging system. If, at step 505, the recipient accepts a link presented during message play-out, at step 515, a determination is made of the link TYPE. If, at step 516, TYPE=CALL, then at step 517, a determination is made from the parameter DEST whether the CALL destination is a PSTN phone number or an IP telephony address. If it is determined to be a PSTN phone number, at step 510, an outcall is initiated to that telephone number by the messaging system. If it is determined to be an IP telephony address, at step 513, the messaging system places an outcall to that IP telephony address. Following either steps 510 or 513, if the outcall to the PSTN telephone number or to the IP telephony address does not transfer the recipient from the messaging system to the outcall destination for a direct connection, then the recipient at the completion of the outcall, returns to the messaging system for continued message play-out at step 507. If, following step 515, it is determined at step 518 that TYPE=MESSAGE, then, at step 511, the messaging system receives recipient's voicemail message and, at step 512, that inputted voicemail message is sent by the messaging system to the linked email address as an attached voice data file. Following the sending of the recipient's voicemail message to the email address, the recipient is returned to the messaging system at step 507 for continued play-out of the stored message. As before, during the continued message play-out, another link may be encountered at step 508 or message play-out may continue, at step 509, until the end of the message. At next step 506 then, the recipient can delete the message, replay the message, retrieve another message, or exit the messaging system.

A structured message may also contain embedded instructions that cause the messaging system to gather information from the recipient as, for example, by playing a prompt that requests an input from the recipient, and collecting a string of keypad inputted touch-tone digits, or audio-inputted information. The structured message thus acts as an interactive form that messaging system 104 assists the recipient in filling out. Combination of the form inputs with a navigational structure means that the recipient may only fill out part of the form, if there is more than one input. The messaging system gathers one or more such inputs, then sends the gathered information as a data message, for example, to a destination specified by the sender. This destination could typically be a network server, such as a Web server with CGI, but could also be a less real-time destination, such as, for example, an email address.

Table 4 is an illustrative structured message that provides such functionality. In this example, the training organization might wish to have the recipient register for a course as well as hearing about it. A registration request provides the recipient's ID as well as the course number.

TABLE 4

```
<PML>
    <FORM ACTION="http://www.training/register.cgi">
        Thanks for inquiring about our training courses.
        You may register for one of our courses by responding to this message.
        Please provide your badge number now.
        <INPUT NAME=badgenum TYPE=NUMBER MAXLENGTH=7>
        <MENU>
            <PROMPT>Please select a course category:</PROMPT>
            <ITEM><TITLE>Unified Messaging Courses</TITLE>
                <SELECT NAME=courseid MULTIPLE>
                    <PROMPT> Please select one or more courses: </PROMPT>
                    <OPTION VALUE="UM101">Introductory Unified Messaging</OPTION>
                    <OPTION VALUE="UM301">Advanced Unified Messaging</OPTION>
                </SELECT>
            </ITEM>
            <ITEM><TITLE>Widget Courses</TITLE>
                <SELECT NAME=courseid MULTIPLE>
                    <PROMPT> Please select one or more courses: </PROMPT>
                    <OPTION VALUE="W101"> Introductory Widgets</OPTION>
                    <OPTION VALUE="W202"> Intermediate Widgets</OPTION>
                    <OPTION VALUE="W301"> Advanced Widgets</OPTION>
                </SELECT>
            </ITEM>
            <ITEM><TITLE>Gadget Courses</TITLE>
                <SELECT NAME=courseid MULTIPLE>
                    <PROMPT> Please select one or more courses: </PROMPT>
                    <OPTION VALUE="G101"> Introductory Gadgets</OPTION>
                    <OPTION VALUE="G201"> Intermediate Gadgets</OPTION>
                    <OPTION VALUE="G301"> Advanced Gadgets</OPTION>
                </SELECT>
            </ITEM>
        </MENU>
        Thank you.
    </FORM>
</PML>
```

When this message is retrieved and played to the recipient, the recipient is again able to navigate within the message, but is this time also prompted for input at certain points, as dictated by the INPUT and SELECT markup elements. The INPUT element causes the messaging system to collect inputs from the recipient in the form of keypad-entered DTMF touch-tone digits or spoken characters, for example. The SELECT element is processed by forming a set of choices in a manner analogous to the MENU element, using the enclosed OPTION elements to determine not only the presented choices, but the values to be returned with the form. The message in Table 4 might produce the following recipient interaction:

"This message contains a fill-out form. You may be prompted for information that will be sent to a service to process the form."

"You may register for one of our courses by responding to this message.

Please provide your badge number now."

(The messaging system waits for the recipient to input information)

(Recipient presses '0123456' on his keypad. The messaging system accepts this, without waiting for timeout or a termination symbol, because it is a correctly formed number exactly seven digits long, as specified by the TYPE and MAXLENGTH attributes of the INPUT element)

"Please select a course category.

For Unified Messaging Courses, press 1;

For Widget - - - "

(Recipient barges in with '2')

"Please select one or more courses:"

"Press one after each item you would like to select, or zero to deselect:

Introductory Widgets;"

(Messaging system pauses, recipient does nothing)

"To select this item, press one; to deselect this item, press zero; to clear all selections and start the list again, press star; to accept current selections, press pound sign."

"Introductory Widgets;"

(Recipient presses 1)

"Intermediate Widgets;"

(Recipient presses 1, then #)

"You selected two items."

"Please select a course category.

For Unified Messaging Courses - - - "

(Recipient barges in with #)

"Thank you."

"To submit the information you entered, press 1 now."

(Recipient presses 1)

At this point the messaging system packages up the information submitted by the recipient into a data message, in this case an HTTP request such as:

GET/register.cgi?badgenum=0123456&courseid=W101&courseid=W201 and sends it to the HTTP server 120 named www.training, and then continues with the mailbox session, retrieving the next message. It should be noted that the badgenum value submitted in the request is the string of numbers entered by the user at the INPUT element, while the courseid values submitted in the request are those specified as VALUE attributes in the OPTION elements corresponding to the choices made by the user.

The HTTP request would result in the information being processed by the training organization's Web server 120. The HTTP response would, in this example, not be used by the messaging system, except possibly to report an error. Processing on the server 120 may lead, however, to a separate confirmation message being sent to the recipient's mailbox.

Figure 6:
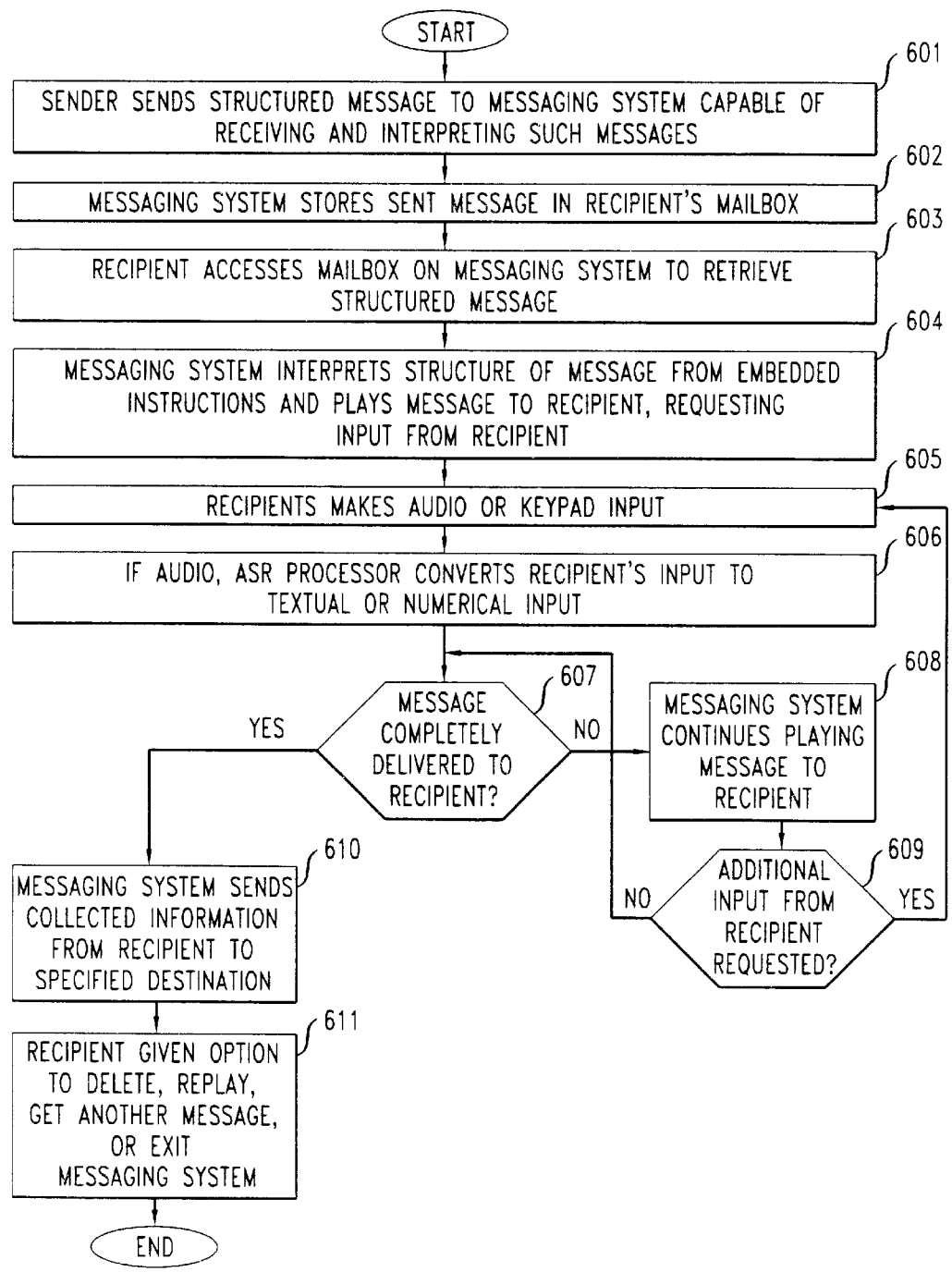
FIG. 6 is a flowchart associated with the steps of sending to a recipient a structured message in which, during a recipient's interaction, information is collected and sent to a specified destination.

The flowchart in FIG. 6 illustrates the steps associated with sending to a recipient a structured message in which, during the recipient's interaction, information is collected from the recipient and sent to a destination that is specified within the message. Steps 601, 602 and 603 are identical to steps 201, 202 and 203 described above, and for brevity, are not repeated herein. At step 604, the messaging system interprets the structure from the embedded instructions and plays-out the message to the recipient, requesting an input from the recipient at one or more points during the message presentation. At step 605, when input from the recipient is requested during play-out of the message, the recipient makes an audio or telephone keypad entry. At step 606, if the recipient has made an audio input, the ASR processor within the messaging system converts the recipient's input to textual or numerical information. At step 607, a determination is made whether the message has been completely delivered to the recipient. If not, at step 608, the messaging system continues playing the message to the recipient. At step 609, a determination is made whether additional input from the recipient is requested during the continued playout. If yes, then flow returns to step 605. If not, the flow returns to decision step 607. If the message has been completely delivered to the recipient at step 607, at step 610, the messaging system sends all the information collected from the recipient to a destination specified in the message. At step 611, the recipient is then given the option to delete, replay, get another message, or exit the messaging system.

Advantageously, the use of the messaging system for gathering information from the recipient and from plural other recipients, such as recipients at telephone sets 121-1–121-4, from the point of view of the message sender, is the distribution of processing. In particular, with such an arrangement it is no longer necessary to maintain a specialized service and a telecommunications infrastructure to allow a plurality of such recipients to simultaneously call into the service.

A structured message may also contain embedded instructions that cause the messaging system 104 not only to submit a form, but to process the response from the server to which the form was submitted. This response may be another message, which the messaging system 104 processes immediately. Since this new message may also be a form, the original message has had the effect of initiating an interactive session with a service active at the remote destination specified by the message sender. From the recipient's standpoint, the perception is that of a complex and dynamic voice interaction with the original message.

In such an interactive setting, it is also possible that no information at all is gathered from the user, but that the only purpose of the action is to process the response from the remote service. This allows a message to point to information that is maintained on a remote server. For example, the sender of the original message might want the recipient to be presented with the most up-to-date version of time-varying information. Moreover, the message size can be considerably smaller since only the content explicitly requested by the recipient will eventually be loaded into the messaging system.

In both cases the messaging system 104 is acting like a Web browser whose user, in this case the message recipient at telephone set 106, is accessing a service on a remote Web server 120. The original message thus acts like a "front page" for the service. The messaging system thus may provide some audio cue that the presented content is in fact a link, such as beeping before presenting the link description.

As an example of the aforedescribed situation, and continuing with the training organization example, it is assumed that the training organization might send a structured message that points to a network service that provides the current offerings rather than sending a structured message with all the current offerings to the mailboxes of each recipient. This insures that the message content does not become obsolete. The service might allow registration for courses, and provide an immediate response to the registration request. Table 5 is an example of a structured message that contains links that retrieve pages from the training Web server 120 at URL www.training.

TABLE 5

```
<PML>
    This is your monthly training course update.
    New courses in the unified messaging area are available this week.
    You can get information on
    <LINK TYPE=PAGE DEST="http://www.training/new.pml">
        new courses
    </LINK>,
    or information on
    <LINK TYPE=PAGE DEST="http://www.training/existing.pml">
        existing courses
    </LINK>.
    You can also
    <LINK TYPE=PAGE DEST="http://www.training/register.pml">
        register for a course
    </LINK>,
    or get
```

TABLE 5-continued

```
    <LINK TYPE=PAGE DEST="http://www.training/general.pml">
        general information about training
    </LINK>.
</PML>
```

For this example, the destination of the link identifies the URL of the page of markup to retrieved by the messaging system from the network. An example of a scenario might be as follows:

"This message contains links, indicated by a beep. Say 'go' to follow a link."

"This is your monthly training course update.

New courses in the unified messaging area are available this week.

You can get information on (beep) new courses"

(Messaging system pauses briefly)

"or information about (beep) existing courses."

(Messaging system pauses briefly)

"You can also (beep) register for a course"

(Messaging system pauses briefly)

(Recipient says 'go')

At this point, the messaging system retrieves the page (i.e., another message) from the Web server at the URL specified in the attributes of the LINK element that the user has chosen to activate, in this case sending an HTTP request:

GET/register.pml to the HTTP server at URL www.training (presumed to be owned by the original message sender). The response to this request will be another page. Table 6 is an example of such a responsive page consisting of another structured message.

TABLE 6

```
<PML>
    <FORM ACTION="http://www.training/register.cgi">
        <INPUT TYPE=HIDDEN NAME=sessionid VALUE="98765">
        Welcome to the course registration service.
        Please provide your badge number now.
        <INPUT NAME=badgenum TYPE=NUMBER MAXLENGTH=7>
        <MENU>
            <PROMPT>Please select a course category:</PROMPT>
            <ITEM><TITLE>Unified Messaging Courses</TITLE>
                <MENU>
                    <PROMPT> Please select a course: </PROMPT>
                    <ITEM><TITLE>Introductory Unified Messaging</TITLE>
                        You selected Introductory Unified Messaging.
                            <SUBMIT NAME=course VALUE="UM101" CONFIRM>
                    </ITEM>
                    <ITEM><TITLE>Advanced Unified Messaging</TITLE>
                        You selected Advanced Unified Messaging.
                            <SUBMIT NAME=course VALUE="UM301" CONFIRM>
                    </ITEM>
                </MENU>
            </ITEM>
            <ITEM><TITLE>Widget Courses</TITLE>
                Sorry, widget courses are oniy offered during widget hunting season.
            </ITEM>
            <ITEM><TITLE>Gadget Courses</TITLE>
                Sorry, gadget courses are no longer offered.
            </ITEM>
        </MENU>
    </FORM>
</PML>
``` with the following interaction:

"Welcome to the course registration service.

Please provide your badge number now."

(Messaging system pauses)

(Recipient inputs '0123456' from the keypad)

"Please select a course category:

For Unified Messaging Courses, press 1;

For Widget Courses, press 2;

For Gadget Courses, press 3.

To exit this menu, press pound sign."

(Recipient presses 1)

"Please select a course:

For Introductory Unified Messaging, press 1;

For Advanced Unified Messaging, press 2;
To return to the previous menu, press pound sign."
(Recipient presses 1)
"You selected Introductory Unified Messaging.
Press 1 to continue, pound sign to cancel."
(Recipient presses #)
"Please select a course:
For Introductory Unified Messaging, press 1;
For Advanced Unified Messaging, press 2;
To return to the previous menu, press pound sign."
(Recipient presses 2)
"You selected Advanced Unified Messaging.
Press 1 to continue, pound sign to cancel."
(Recipient presses 1)
At this point, the messaging system submits another form, sending an HTTP request GET/register.cgi?sessionid=98765&badgenum=0123456&courseid=UM301 to the Web server at URL www.training. This second form submission could lead to a continued session (e.g., a chance to register for another course). For this example, however, the remote service terminates the session with a confirmation message shown in Table 7, which is similar to the message in Table 1, as previously discussed.

TABLE 7

```
<PML>
    <AUDIO SRC="thanks.au"/>
    <AUDIO SRC="confirm.au"/>
    Peter Mataga
    <AUDIO SRC="course.au"/>
    UM301: Advanced Unified Messaging
    <AUDIO SRC="when.au"/>
    January 26, 1999 from 3:00pm to 5:00pm
</PML>
```

This results in the following presentation to the recipient:
"Thanks for registering. This confirms that Peter Mataga is registered for course UM301:Advanced Unified Messaging, scheduled to take place Jan. 26, 1999 from 3:00 pm to 5:00 pm."
"Message processing complete."
(The messaging system, them proceeds to offer the recipient the usual mailbox actions such as delete, next, etc.)

The advantage of this above-discussed mechanism is that the original structured message, which may possibly be a bulk email sent to many recipients, is small. When some subset of recipients choose to respond, the messaging system 104 again performs much of the processing associated with gathering information.

Figure 7:
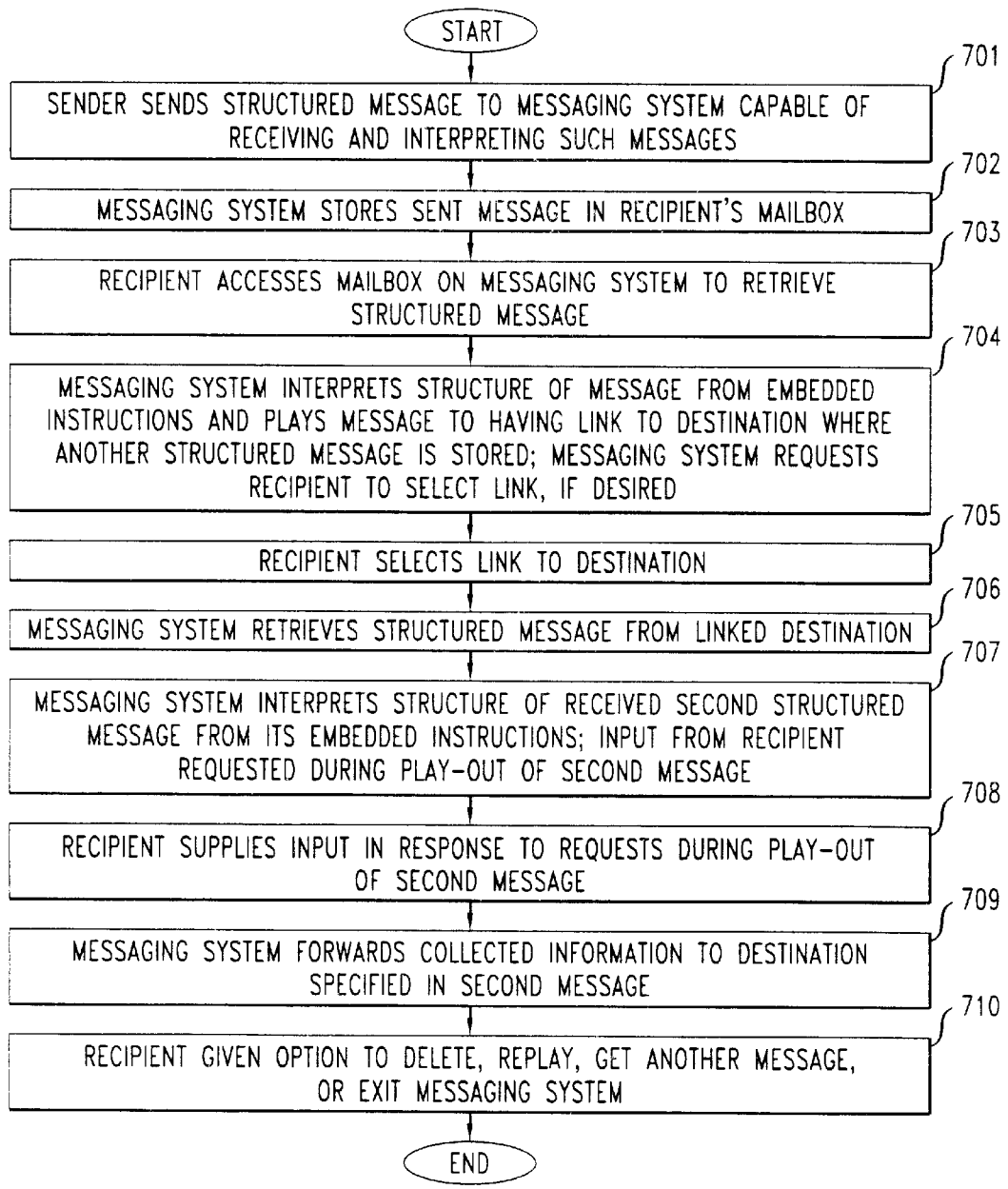
FIG. 7 is a flowchart associated with the steps of sending to a recipient a structured message in which, during a recipient's interaction, information is retrieved from a specified from a specified destination to enable further interaction between the recipient and that information.

The flowchart in FIG. 7 illustrates the steps associated with sending to a recipient a structured message in which, during a recipient's interaction with that structured message, information, such as a second structured message, is retrieved from a destination specified within the message, to possibly enable further interaction between the recipient and the information retrieved from that destination. Steps 701, 702 and 703 are identical to steps 201, 202 and 203, respectively, described above in connection with the flowchart in FIG. 2, and, for brevity, are not repeated here. At step 704, the messaging system interprets the structure of message from embedded instructions and plays to the recipient a message having at least one embedded link to a destination where a second structured message is stored. During playing of the first message, an input from the recipient is requested to select a particular link. At step 705, the recipient selects a link to that destination. At step 706, the messaging system retrieves the second structured message from the linked destination. At step 707, the messaging system interprets the structure of the retrieved second structured message from its embedded instructions and plays to the recipient the second message, which may request input from the recipient at specific points during play-out of that message. At step 708, the recipient supplies to the messaging system the requested inputs at those specific points during play-out of the second message. At step 709, the messaging system forwards to a destination specified within the second message, the information collected during the play-out of the second structured message. The response to that can be another structured message (not shown), or, at step 710, the continuation of the recipient's mailbox session where the recipient can delete or replay the original message, access another stored message, or end his mailbox session.

The various substructure types described above can be combined in various ways. For example, a structured message (or sequence of such messages) can cause coordinated data and telephony actions. In this example, the messaging system 104 collects inputs from the recipient at telephone set 106, communicates data to a server, and then also places a telephone call over the PSTN to a phone number associated with the data destination. On call answer, DTMF signaling (or another signaling method) is used to transmit sufficient information (e.g., a reference ID) to allow the system receiving the telephone call to access the form data that was separately sent. The receiving system may then use that data to enhance the handling of the telephone call in various ways such as routing it to an appropriate agent, and/or providing a screen pop of the submitted form data and retrieved data to the agent's terminal. Alternatively, an IP telephony call could be placed to an IP telephony number associated with the data destination.

As an example, it is postulated that the registration process requires interaction with a human agent, but that it is desired to collect data from the registrant automatically rather than through the live interaction. The messaging system 104 can be used to collect the information, essentially becoming part of a distributed call center. This information can be collected before any phone call is made to the human registration agent, thereby potentially representing a substantial reduction in the load on the phone lines to the registration department's call center as compared to what would otherwise be a traditional call center which would need to maintain a dedicated voice response system.

One way to achieve coordination between the form submission and the outcall can be demonstrated in the previous example, if the response to the form submission containing the course registration information is not a simple confirmation message, but a response indicating that a call should be placed. The information for the call preferably will indicate a session ID or some other identifier, which the system receiving the call interprets in order to retrieve the associated data. Table 8 illustrates an example of a responsive page to the registration.

TABLE 8

```
<PML>
    <AUDIO SRC="thanks.au"/>
    <AUDIO SRC="confirm.au"/>
    Peter Mataga
    <AUDIO SRC="course.au"/>
    UM301: Advanced Unified Messaging
    <AUDIO SRC="when.au"/>
    January 26, 1999 from 3:00pm to 5:00pm.
    <LINK TYPE=CALL DEST="pstn:630-555-4444" DTMF="3,2,98765" IMMEDIATE>
        <AUDIO SRC="agent.au"/>
    </LINK>
</PML>
```

This deviates from the previous example in which, after registering, only the confirmation message of Table 7 is played to the recipient. In this case, the call proceeds without the recipient's initiation because of the IMMEDIATE attribute of the LINK. The following is therefore the interaction:

"Thanks for registering. This confirms that Peter Mataga is registered for course UM301:Advanced Unified Messaging, scheduled to take place Jan. 26, 1999 from 3:00 pm to 5:00 pm."

"A call is being placed to a customer agent at phone number 630-555-4444. Press pound to terminate the call."

(The messaging system dials 630-555-4444 [the phone number associated with the registration system call center 125 in FIG. 1], waits for answer, sends DTMF tone 3, pauses, then sends tone 2, pauses, then sends tones 98765, conferences in voicemail user, then waits for call termination)

(The session ID 98765 is used by the receiving system to route the call to an appropriate agent at telephone 126, and to trigger a screen pop of the submitted registration information on the agent's client terminal 127.)

In above mechanism, the called service is assumed to have the special functionality that enables the interaction to take place. Since the service owner is presumably the sender of the message, the service owner would be so configured. Advantageously, as in previous examples, the preparation of the registration data is completed before the establishment of the phone call, thereby reducing the load on the call center.

Figure 8:
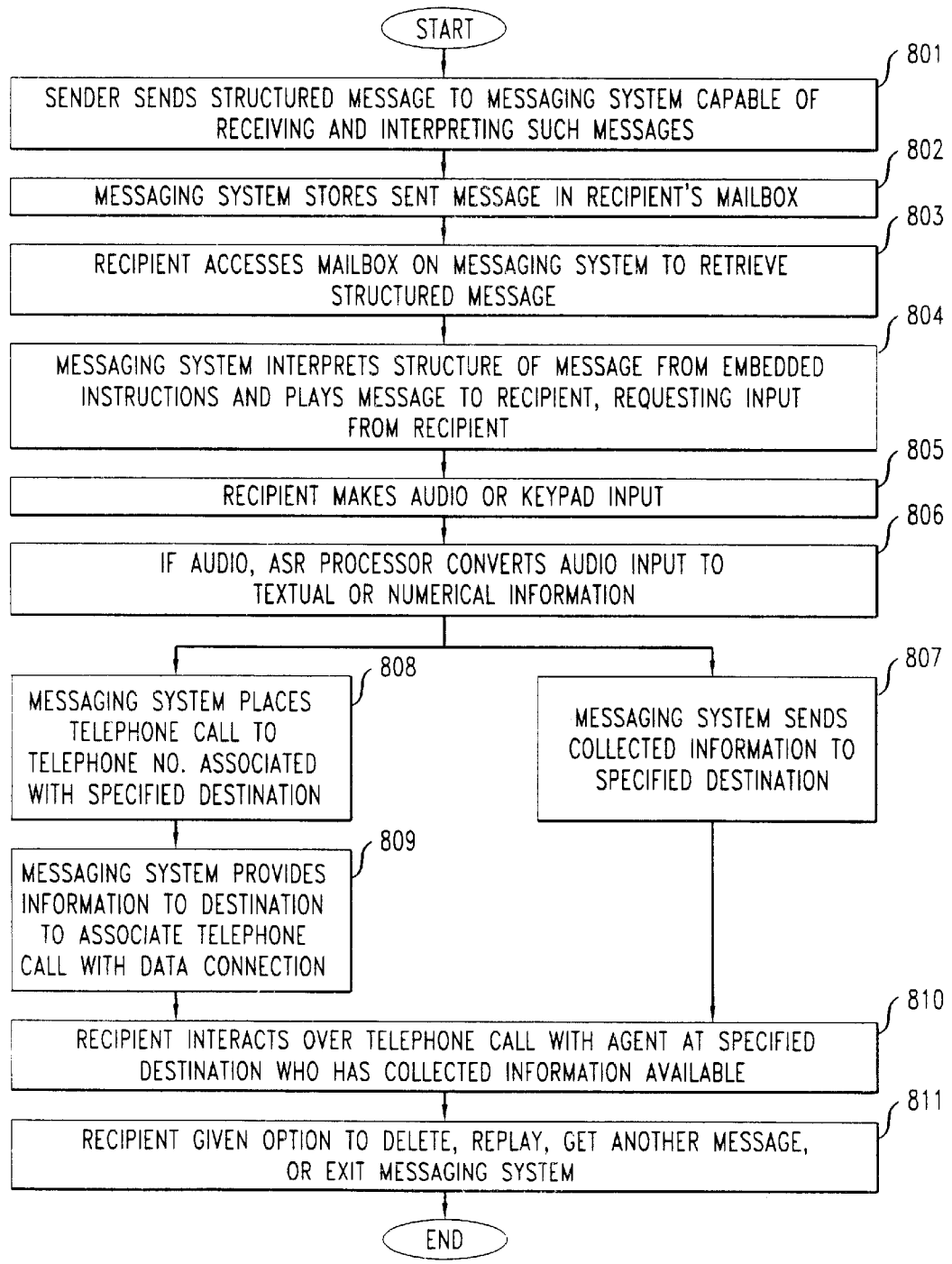
FIG. 8 is a flowchart associated with the steps of sending to a recipient a structured message in which, during a recipient's interaction, information is collected from the recipient and sent to a specified destination, and a separate call is established between the recipient and that specified destination.

The flowchart in FIG. 8 illustrates the steps associated with sending to a recipient a structured message in which, during a recipient's interaction with that structured message, information is collected from the recipient and sent to a specified destination, and a separate call (telephone over PSTN, IP telephony over data network, or any other type of call) is established by the messaging system to a number associated with that specified destination. Steps 801, 802 and 803 are identical to steps 201, 202 and 203, respectively, described above in connection with the flowchart in FIG. 2, and, for brevity, are not repeated here. At step 804, the messaging system interprets the structure of the message from the embedded instructions and plays the message to the recipient, requesting input from the recipient at various points during play-out. At step 805, the recipient supplies audio and/or keypad input at the requested points during message play-out. At step 806, if the recipient provides audio input, ASR circuitry in the messaging system converts the audio input to textual or numerical information, as appropriate. At step 807, the messaging system sends the information collected from the recipient to a destination specified within the structured message. At step 808, in parallel, at the same time or later after receiving another structured message from the destination, a separate call (such as a telephone call over the PSTN or an IP telephony call over data network) is placed to the destination, or to a second destination from which the collected information can be retrieved. At step 809, the messaging system provides information to that first or second destination that identifies in some manner the collected information. At step 810, the recipient interacts over the call with an agent at the first or second destination who has available the collected information. If the call to the first or second destination has not effected a transfer of the recipient to such destination, at step 811, after completing the call, the recipient may continue with his mailbox session.

Figure 9:
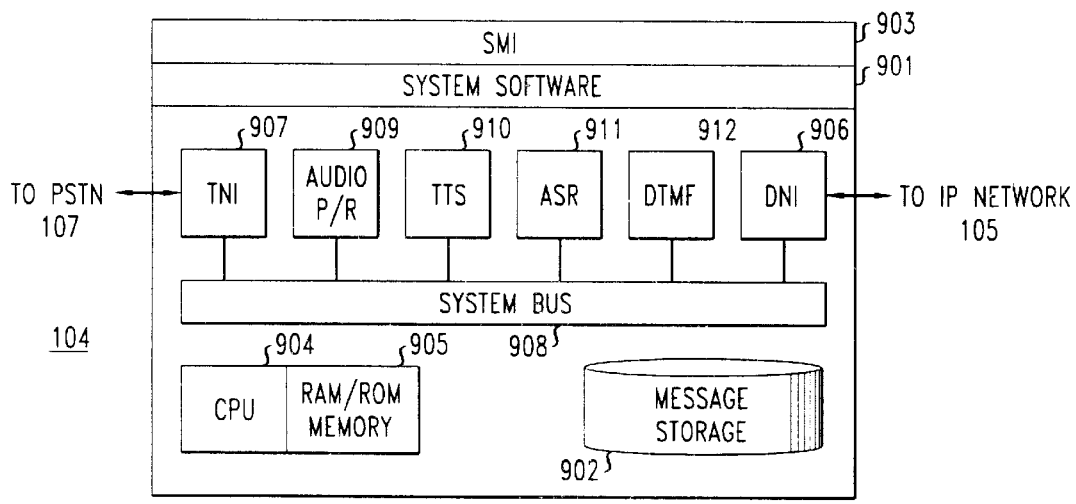
FIG. 9 is a block diagram of an integrated messaging system that receives, interprets and presents a structured message.

With reference now to FIG. 9, a block diagram of integrated messaging system 104 is shown. The messaging system 104 includes system software 901 which provides the operating system and associated software for hardware interfaces to enable communication with individual hardware components. Further, the system software performs those conventional messaging functions such as controlling the receipt of conventional audio, conventional email, and structured type of messages as described above, storage of such messages in a message storage database 902 for each recipient, deletion from storage of such messages in response to a recipient's direction, etc. Running on top of system software 901 is a structured message interpreter (SMI) 903 which, when a structured type of message is retrieved by a recipient from message storage 902, interprets the embedded instructions (the markup in the embodiment described above) and converts the structured message document into audio delivery for presentation to the recipient and with which the recipient may interact, if so structured, through audio means. Further, SMI 903 controls the playing, at the appropriate times as defined in the structured message, of audio files that are associated with the message and that may be attached to the message or retrieved from elsewhere. Functioning of system software 901 and SMI 903 is effected through a central processing unit 904 and associated RAM/ROM memory 905. Various other modules are also included within messaging system 104, which can be implemented in hardware, software, and/or a combination of hardware and software. Further, some of the modules may effect processing within CPU 904 rather than within the module itself.

A first network interface module is data network interface (DNI) 906, into which IP network 105 is terminated. DNI 906 thus receives delivery of a structured message sent over the network by a sender, which it then forwards to message storage 902 for later retrieval by the intended recipient. Further, as previously described, when information is collected from a recipient during retrieval of an interactive message, DNI 906 outputs that information for transmission to a destination connected to IP network 105 if so specified within the structured message. A second network interface module is telephone network interface (TNI) 907, to which PSTN telephone lines, such as a tip/ring analog interfaces or T1 digital lines, are terminated. A recipient's PSTN telephone call to messaging system 104 to retrieve his messages thus terminates at TNI 907. TNI 907 thus also outputs the play-out of a retrieved structured message in accordance with the message's embedded instructions, as interpreted by SMI 903. Further, the keypad or audio inputs entered by the recipient during play-out of the message as navigational selections or input of solicited information are inputted through TNI 907. TNI 907 and DNI 906 are both connected to a system bus 908, as are the other illustrative modules shown in FIG. 9: audio play/record (P/R) module 909; text-to-speech (TTS) module 910; automatic speech recognition (ASR) module 911;and dual-tone multi-frequency (DTMF) detector module 912.

Audio P/R module 909 includes the hardware and/or software for playing the recorded audio that has been stored as a data file and attached to a message. That message can be a conventional email message with a .WAV attached file, or a structured message of the type discussed herein above, where recorded audio messaging elements or message fragments, as previously described, are attached as data files to the structured message or retrieved from a specified source. Audio P/R module 909 may also convert a recipient's responsive audio input within a structured input, which may then be converted to a data file and outputted through DNI 906 as an attached file for transmission to a specified destination on IP network 105.

Text-to-speech (TTS) module 910, which may be implemented in hardware, software, or a combination of hardware and software, includes a digital signal processor, which may be implemented within the module itself or on CPU 904. TTS module 910 converts the textual fragments within the structured message to speech during play-out of the message to the recipient. Automatic speech recognition (ASR) module 911, which may also be implemented in hardware, software, or a combination of hardware and software, monitors the recipient's audio input, recognizing the recipient's utterances. These recipient inputs are converted into commands or recognized as inputs, depending upon where during the message play-out they are received. Dual-tone multi-frequency (DTMF) module 912, which also can be implemented in hardware, software, or a combination of hardware and software, recognizes recipient's keypad entries. These keypad entries may also be commands or inputs, depending upon the message structure where, for example, the recipient may make a keypad entry during message play-out to select a link, or the recipient may make a keypad entry as an input as part of an information collection process.

Figure 10:
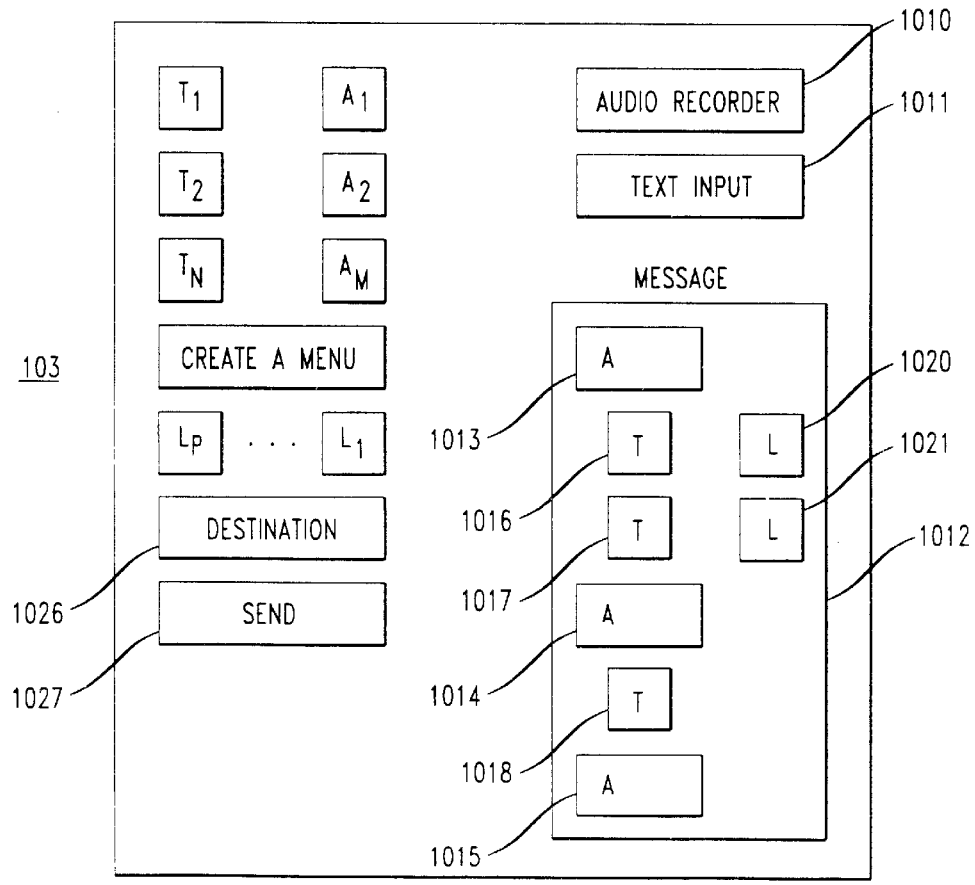
FIG. 10 is a block diagram of a graphical user interface (GUI) for creating a structured message.

As previously described, a structured message can be created by a sender through an editor running on a client terminal. An example of an editor's GUI 103 that can be used by a sender to create a structured message is shown in FIG. 10. As can be noted, GUI 103 includes a plurality of predefined textual and prerecorded audio fragments that are stored and accessed through buttons $T_1$–$T_N$ and $A_1$–$A_N$, respectively. The sender has these predefined fragments available to formulate a message. By activating an audio recorder through button 1010, the sender can record, using a microphone associated with the client terminal, one or more audio clips that can be incorporated into the message and affixed to the message as audio data files. Similarly, by inputting text through the text input window 1011, the sender can create textual fragments to be incorporated as part of the message which, when received by the messaging system and retrieved by the recipient, will be converted from text into speech. The structured message is created by the sender by selecting from those predetermined textual fragments available at $T_1$–$T_N$, audio fragments available through $A_1$–$A_M$, and customized inputted audio fragments and textual fragments, and dragging them, using a mouse, into the message box 1012, to create a desired message structure. The selected audio fragments, 1013, 1014 and 1015 are combined with selected textual fragments 1016, 1017 and 1018, as intended by the sender and in a structured format selected by the sender. By selecting a "create a menu" button 1019, the sender creates a navigational nest of options that will be presented to the eventual recipient, including, for example, the audio fragment 1013, and textual fragments 1016 and 1017. Upon selecting the "create a menu" button 1019, the sender may be queried as to what prompts are to be given to the recipient, what titles are to be associated with each selective choice, and what messaging elements are to be incorporated within the menu. Further, the message may include links 1020 and 1021, which can be selected by the sender from one of a predetermined number of recorded and stored links $L_1$–$L_p$, or inputted by the sender through window 1025. When the message has been formulated by the sender, and a destination entered into destination window 1026, the sender selects the send button 1027, and the editor generates a PML-formatted version of the structured message, with attached data representations of the included audio files, which is sent to the recipient at the indicated destination.

The structured message could also be created "by hand" with a text editor and an audio file recording utility.

Although described in terms of audio messaging, it should be apparent to one skilled in the art, that the present invention could be equally be applied to multimedia messaging, in which a structured multimedia message would include a plurality of messaging elements, which may include video fragments, which be assembled by the messaging system in accordance with embedded instructions included within the structured message. Thus, a structured multimedia message could include also provide the recipient with the navigational options described above in connection with the audio message, as well as the ability to link to another destination, as well as the other previously described aspects of structured messaging for audio messaging.

Further, although the above-described embodiment incorporated a phone markup language as the methodology of embedding instructions that define the structure of the message and which are used by the interpreter at the messaging system to play-out the message and offer the recipient the navigational choices within the message, there are other ways that such instructions could be embedded within the message that do not use a markup language. Thus, for example, the message could be formulated using an Electronic Data Interchange (EDI), or any other kind of pre-agreed interchange format between senders and the interpreter running on the messaging system, that allow the messaging system to interpret the message structure and present to the recipient the structured message in accordance with those instructions.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that have been recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, pseudocode and the like represent various processes which may be substantially represented in computer readable medium and so executed by a computer or processor, whether or not such computer or processor is explicitly shown.

The functions of the various elements shown in the FIGs., including functional blocks labeled as "processors" or "servers" may be provided through the use of dedicated hardware as well as hardware capable of executing software in association with appropriate software. When provided by a processor, server or computer, the functions may be provided by a single dedicated processor, by a single shared processor, or by a plurality of individual processors, some of which may be shared. Moreover, explicit use of the term "processor", "server", or "computer" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide these functionalities as being equivalent to those shown herein.

The invention claimed is:

1. An electronic message comprising:
    a plurality of messaging elements, at least some of the messaging elements being content-related that are each associated with a portion of the content of the message and at least one of the messaging elements comprising instructions that define a structure of the message from which at least some of the content-related messaging elements can be sequentially combined for presentation to a recipient as a unified message; and
    an address of the recipient of the message on a messaging system that stores the message and is capable of interpreting the instructions, assembling and combining at least some of the content-related messaging elements in accordance with the instructions, and sequentially presenting the assembled and combined content-related messaging elements to the recipient as a unified message when the recipient retrieves the message from storage.

2. The electronic message of claim 1 wherein the message is a voicemail message.

3. The electronic message of claim 1 wherein the message is a multimedia message.

4. The electronic message of claim 2 wherein the content-related messaging elements comprise at least one from a group including: textual fragments, speech fragments, and references to speech and/or textual fragments stored at specified locations.

5. The electronic message of claim 4 wherein the speech fragments comprise references to audio data files associated with the message.

6. The electronic message of claim 4 wherein the instructions are embedded in the message using a phone markup language.

7. The electronic message of claim 1 wherein the instructions define a hierarchical menu structure which, when the message is retrieved by the recipient and at least some of the content-related messaging elements are assembled and combined by the messaging system and sequentially presented to the recipient, offers a plurality of navigational choices within the message to the recipient, at least one previously non-presented content-related messaging element next presented to the recipient being determined by a selection by the recipient of at least one of the navigational choices.

8. The electronic message of claim 1 wherein a link to a destination is associated with at least one of the content-related messaging elements presented to the recipient.

9. The electronic message of claim 8 wherein the link defines an address for establishing a telephony connection.

10. The electronic message of claim 9 wherein the address for establishing the telephony connection is a telephone number on the PSTN.

11. The electronic message of claim 9 wherein the address for establishing the telephony connection is an IP telephony address.

12. The electronic message of claim 8 wherein the link defines an address for delivering a message.

13. The electronic message of claim 12 wherein the address for delivering a message is an email address.

14. The electronic message of claim 12 wherein the address for delivering a message is a Web address.

15. The electronic message of claim 8 wherein the link defines an address for retrieving a second electronic message.

16. The electronic message of claim 15 wherein the second electronic message comprises a plurality of its own messaging elements, at least some of the messaging elements in the second message being content-related that are each associated with a portion of the content of the second message, and at least one of the messaging elements in the second message comprising instructions that define a structure of the second message from which at least some of the content-related messaging elements in the second message can be sequentially combined for presentation to the recipient as a unified message.

17. The electronic message of claim 1 wherein the instructions define a message structure which, when the message is retrieved and at least some of the content-related messaging elements are assembled and combined and sequentially presented to the recipient, input of information from the recipient is requested and collected by the messaging system and sent to a destination indicated in the message.

18. The electronic message of claim 17 wherein the information from the recipient includes recipient's keypad entries.

19. The electronic message of claim 17 wherein the information from the recipient includes recipient's audio input.

20. An electronic message comprising:
a plurality of message fragments, each associated with at least a portion of the content of the message;
a plurality of instructions embedded within the message that together define a structure of the message, said instructions including information indicating how at least some of the message fragments are to be sequentially combined for presentation to a recipient as a unified message; and
an address of the recipient on a messaging system that stores the message and is capable of interpreting the instructions, assembling and combining at least some of the message fragments in accordance with the instructions, and sequentially presenting the assembled and combined message fragments to the recipient as a unified message when the recipient retrieves the message from storage.

21. The electronic message of claim 20 wherein the message is a voicemail message.

22. The electronic message of claim 21 wherein the message fragments comprise at least one from a group including: textual fragments, speech fragments, and references to speech and/or textual fragments stored at specified locations.

23. The electronic message of claim 22 wherein the speech fragments comprise references to audio data files.

24. The electronic message of claim 22 wherein the instructions are embedded in the message using a phone markup language.

25. The electronic message of claim 20 wherein the message is a multimedia message.

26. The electronic message of claim 20 wherein the instructions define a hierarchical menu structure which, when the message is retrieved by the recipient and at least some of the message fragments are assembled and combined by the messaging system and sequentially presented to the recipient, offers a plurality of navigational choices within the stored message to the recipient, at least one previously non-presented message fragment next presented to the recipient being determined by a selection by the recipient of at least one of the navigational choices.

27. The electronic message of claim 20 wherein a link to a destination is associated with at least one of the message fragments presented to the recipient.

28. The electronic message of claim 27 wherein the link defines an address for messaging.

29. The electronic message of claim 28 wherein the address for messaging is an email address.

30. The electronic message of claim 28 wherein the address for messaging is a Web address.

31. The electronic message of claim 27 wherein the link defines an address for a telephony connection.

32. The electronic message of claim 31 wherein the address for the telephony connection is a telephone number on the PSTN.

33. The electronic message of claim 31 wherein the address for the telephony connection is an IP telephony address.

34. The electronic message of claim 27 wherein the link defines an address for retrieving a second electronic message.

35. The electronic message of claim 34, wherein the second electronic message comprises a plurality of its own message fragments, each associated with at least a portion of the content of the second message; and a plurality of instructions embedded within the second message that together define a structure of the second message, said instructions for the second message including information indicating how at least some of the message fragments in the second message are to be sequentially combined for presentation to the recipient as a unified message.

36. The electronic message of claim 20 wherein the instructions define a structure which, when the message is retrieved and at least some of the message fragments are combined and sequentially presented to the recipient, input of information from the recipient is requested and collected by the messaging system and sent to a destination indicated in the message.

37. The electronic message of claim 36 wherein the information from the recipient includes recipient's keypad entries.

38. The electronic message of claim 36 wherein the information from the recipient includes recipient's audio input.

* * * * *